(12) United States Patent
Chapman et al.

(10) Patent No.: US 8,928,625 B2
(45) Date of Patent: Jan. 6, 2015

(54) RETROREFLECTOR FOR USE IN TOUCH SCREEN APPLICATIONS AND POSITION SENSING SYSTEMS

(75) Inventors: Steven R. Chapman, Glenview, IL (US); Simon Bridger, Auckland (NZ)

(73) Assignee: Avery Dennison Corporation, Glendale, CA (US)

( * ) Notice: Subject to any disclaimer, the term of this patent is extended or adjusted under 35 U.S.C. 154(b) by 697 days.

(21) Appl. No.: 12/351,913

(22) Filed: Jan. 12, 2009

(65) Prior Publication Data

US 2009/0295755 A1 Dec. 3, 2009

Related U.S. Application Data

(60) Provisional application No. 61/020,921, filed on Jan. 14, 2008, provisional application No. 61/080,393, filed on Jul. 14, 2008.

(51) Int. Cl.
*G06F 3/042* (2006.01)
*G02B 5/122* (2006.01)
*G02B 5/124* (2006.01)

(52) U.S. Cl.
CPC .............. *G02B 5/124* (2013.01); *G06F 3/0428* (2013.01)
USPC ............................ 345/175; 359/529; 359/530

(58) Field of Classification Search
None
See application file for complete search history.

(56) References Cited

U.S. PATENT DOCUMENTS

| | | | |
|---|---|---|---|
| 2,407,680 | A | 9/1946 | Palmquist et al. |
| 3,541,606 | A | 11/1970 | Heenan et al. |
| 3,563,771 | A | 2/1971 | Tung |
| 3,758,193 | A | 9/1973 | Tung |

(Continued)

FOREIGN PATENT DOCUMENTS

| | | |
|---|---|---|
| WO | 99/36805 | 7/1999 |
| WO | 02/101423 | 12/2002 |
| WO | 2004-061489 | 7/2004 |
| WO | 2009/091681 | 7/2004 |

OTHER PUBLICATIONS

Demand and Amendments filed in corresponding IA No. PCT/US2009/030694 dated Oct. 12, 2009.

(Continued)

*Primary Examiner* — Dismery Mercedes
(74) *Attorney, Agent, or Firm* — Avery Dennison Corporation

(57) ABSTRACT

A touch screen system and prismatic film includes a retroreflective substrate having a plurality of retroreflective elements having triangular cube corners. A metallized layer is disposed over at least a portion of the retroreflective elements. In one embodiment, the prismatic film includes two colored substrates mounted over the retroreflective elements. In another embodiment, a single substrate is mounted over the retroreflective elements. It is often desired that a color of the substrate(s) be chosen that is highly transparent in the infrared spectrum, but is also non-transparent in the visible light spectrum, giving the prismatic film a dark appearance. The prismatic film includes a plurality of retroreflective elements having triangular cube corners with a cant in a range between about 4 degrees in a face more parallel direction to 18 degrees in an edge more parallel direction and a cube depth between about 0.002 and 0.008 inches or with a cant of about 5.5 to 22 degrees in an edge more parallel direction and a cube depth between about 0.0005 and 0.004 inches, or with a cant of about 8 to 35 degrees in a face more parallel direction and a cube depth between 0.001 and 0.012 inches.

24 Claims, 10 Drawing Sheets

(56) References Cited

U.S. PATENT DOCUMENTS

| | | | |
|---|---|---|---|
| 3,810,804 A | 5/1974 | Rowland | |
| 3,830,682 A | 8/1974 | Rowland | |
| 4,243,618 A | 1/1981 | Van Arnam | |
| 4,486,363 A | 12/1984 | Pricone et al. | |
| 4,507,557 A * | 3/1985 | Tsikos | 250/341.7 |
| 4,588,258 A | 5/1986 | Hoopman | |
| 4,601,861 A | 7/1986 | Pricone et al. | |
| 5,138,488 A | 8/1992 | Szczech | |
| 5,200,851 A | 4/1993 | Coderre et al. | |
| 5,450,235 A * | 9/1995 | Smith et al. | 359/529 |
| 5,712,024 A | 1/1998 | Okuzaki et al. | |
| 5,742,411 A * | 4/1998 | Walters | 359/2 |
| 5,936,770 A | 8/1999 | Nestegard et al. | |
| 6,015,214 A | 1/2000 | Heenan et al. | |
| 6,406,758 B1 | 6/2002 | Bottari et al. | |
| 6,406,798 B2 * | 6/2002 | White et al. | 428/522 |
| 6,537,673 B2 | 3/2003 | Sada et al. | |
| 6,767,102 B1 * | 7/2004 | Heenan et al. | 359/530 |
| 6,817,724 B2 * | 11/2004 | Mimura et al. | 359/529 |
| 7,021,134 B2 * | 4/2006 | Dykas et al. | 73/204.22 |
| RE40,455 E | 8/2008 | Heenan et al. | |
| 7,445,347 B2 | 11/2008 | Couzin | |
| RE40,700 E | 4/2009 | Heenan et al. | |
| 7,518,676 B2 * | 4/2009 | Minoura et al. | 349/113 |
| 8,248,691 B2 | 8/2012 | Wei et al. | |
| 8,419,197 B2 * | 4/2013 | Smith | 359/530 |
| 2001/0048169 A1 * | 12/2001 | Nilsen et al. | 264/2.5 |
| 2002/0163505 A1 | 11/2002 | Takekawa | |
| 2003/0203211 A1 | 10/2003 | Wei et al. | |
| 2003/0203212 A1 * | 10/2003 | Wei et al. | 428/412 |
| 2005/0147796 A1 * | 7/2005 | Benson et al. | 428/167 |
| 2005/0178953 A1 | 8/2005 | Worthington et al. | |
| 2005/0185279 A1 * | 8/2005 | Mullen et al. | 359/530 |
| 2005/0190162 A1 * | 9/2005 | Newton | 345/175 |
| 2005/0208239 A1 | 9/2005 | Nielsen et al. | |
| 2005/0248540 A1 | 11/2005 | Newton | |
| 2006/0007543 A1 | 1/2006 | Couzin et al. | |
| 2006/0108062 A1 * | 5/2006 | Smith et al. | 156/272.2 |
| 2007/0139775 A1 | 6/2007 | Reich et al. | |
| 2007/0223092 A1 | 9/2007 | Moreau | |
| 2007/0268582 A1 | 11/2007 | Smith | |
| 2008/0049327 A1 | 2/2008 | Smith | |
| 2008/0103267 A1 | 5/2008 | Hurst et al. | |
| 2009/0135162 A1 | 5/2009 | Van De Wijdeven et al. | |
| 2009/0185272 A1 | 7/2009 | Smith | |
| 2012/0056807 A1 * | 3/2012 | Chapman et al. | 345/158 |

OTHER PUBLICATIONS

International Preliminary Report on Patentability issued in corresponding IA No. PCT/US2009/030694 dated Apr. 26, 2010.

Invitation to Pay Additional Fees and Partial Search Report issued in corresponding IA No. PCT/US2009/030694 dated May 4, 2009.

International Search Report and Written Opinion issued in corresponding International Application No. PCT/US2009/030694 dated Aug. 5, 2009.

International Search Report and Written Opinion issued in related International Appl. No. PCT/US2010/059880 dated Jun. 22, 1011.

Invitation to Pay Additional Fees issued in related International Appl. No. PCT/US2010/059880 dated May 3, 2011.

Chinese Office Action issued in related CN Appl. No. 200980109052.X dated Dec. 12, 2011.

Extended European Search Report issued in related EP Appl. No. 11 003 497.2 dated Aug. 2, 2011.

EP Communication issued in related EP Appl. No. 09 702 040.8 dated Aug. 1, 2011.

* cited by examiner

RETROREFLECTOR FOR USE IN TOUCH SCREEN APPLICATIONS AND POSITION SENSING SYSTEMS

RELATED APPLICATION DATA

This application claims the benefit of U.S. Provisional Application No. 61/020,921, filed Jan. 14, 2008, and U.S. Provisional Application No. 61/080,393 filed Jul. 14, 2008, both of which are incorporated herein by reference.

TECHNICAL FIELD

The present invention relates generally to a system and method for detecting the position of an object within a touch screen or a position sensing system and a retroreflective or prismatic film used thereby. The system includes a prismatic film having metallized triangular cube corner retroreflective elements that provide a suitable background for contrasting an opaque object against the touch screen and/or the position sensing system and the prismatic film is highly transparent in a selected portion of the electromagnetic spectrum to facilitate detection of the object within the touch screen application and/or the position sensing system.

BACKGROUND

Some position detection systems related to touch screens sense the interruption of radiation (e.g., light) by an opaque object (e.g., a finger, stylus, etc.). Such systems generally utilize radiation transmitters for transmitting radiation across the field of the touch screen, parallel to the viewing field surface. Radiation receivers are used to detect the radiation that passes across the field of the touch screen and sense the existence and location of any interruption in this radiation by the opaque object.

A retroreflective sheeting material may be positioned around the perimeter of the active field of the touch screen, as disclosed in U.S. Pat. No. 4,507,557. The retroreflective sheeting material is generally arranged to reflect radiation received from an originating source back toward the originating source. An exemplary retroreflective sheeting material generally includes a layer of clear resin, such as acrylic, polycarbonate or vinyl, having a smooth front surface and a plurality of retroreflective cube corner prisms on the reverse surface. Light incident on the smooth front surface passes through the sheeting, impinges on the retroreflective elements, and is reflected back out through the smooth front surface in a direction nominally 180 degrees to the direction of incidence.

One problem with the use of certain conventional retroreflective sheeting materials in touch screen applications and/or position detection systems is that dirt and/or moisture may penetrate the structure and adversely affect retro reflectivity of the retroreflective sheeting material. Another problem with conventional retroreflective sheeting material used in touch screen applications and/or position detection systems is difficulty in obtaining a uniform background throughout the area of interest (e.g., the detection area), against which the opaque object can be contrasted. Many conventional retroreflective sheeting material designs provide a non-uniform background and have portions, especially at or near the corner regions where the detected signal is very low. This makes it difficult to detect movement of the opaque object in such areas.

SUMMARY OF THE INVENTION

In view of the foregoing, a need exists for a retroreflective sheeting design that provides the optical and mechanical performance benefits of metallized sheeting.

One aspect of the invention relates to a touch screen system including: at least one source of electromagnetic radiation for outputting electromagnetic radiation over at least a portion of a viewing area; and a camera positioned to receive electromagnetic radiation reflected from a prismatic film positioned along a periphery of at least a portion of the viewing area, wherein the prismatic film includes a plurality of retroreflective elements having triangular cube corners with a cant in a range between about 4 in a face more parallel direction and 18 degrees in edge more parallel direction and a cube depth between about 0.002 and 0.008 inches.

Another aspect of the invention relates to a prismatic film including: a retroreflective substrate having a plurality of triangular cube corner retroreflective elements; a metallized layer disposed over at least a portion of the retroreflective elements; and a first substrate disposed over at least a portion of the retroreflective substrate, wherein the first substrate has a smooth outer surface.

Another aspect of the invention relates to reflective film including: an unpinned retroreflective substrate having a plurality of retroreflective elements having triangular cube corners with a cant in a range of between about 4 and 18 degrees in an edge more parallel direction and a cube depth between about 0.002 and 0.008 inches or with a cant of about 5.5 to 22 degrees in an edge more parallel direction and a cube depth between about 0.0005 and 0.004 inches or with a cant of about 8 to 35 degrees in a face more parallel direction and a cube depth between 0.001 and 0.012 inches.

Another aspect of the invention relates to an infrared reflective film including: a prismatic film having a plurality of retroreflective elements having triangular cube corners with a cant in a range of between about 4 and 18 degrees in an edge more parallel direction and a cube depth selected based on a size of a display in which the film is used.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

BRIEF DESCRIPTION OF DRAWINGS

These and further features of the present invention will be apparent with reference to the following description and drawings, wherein.

DISCLOSURE OF INVENTION

Figure 1:
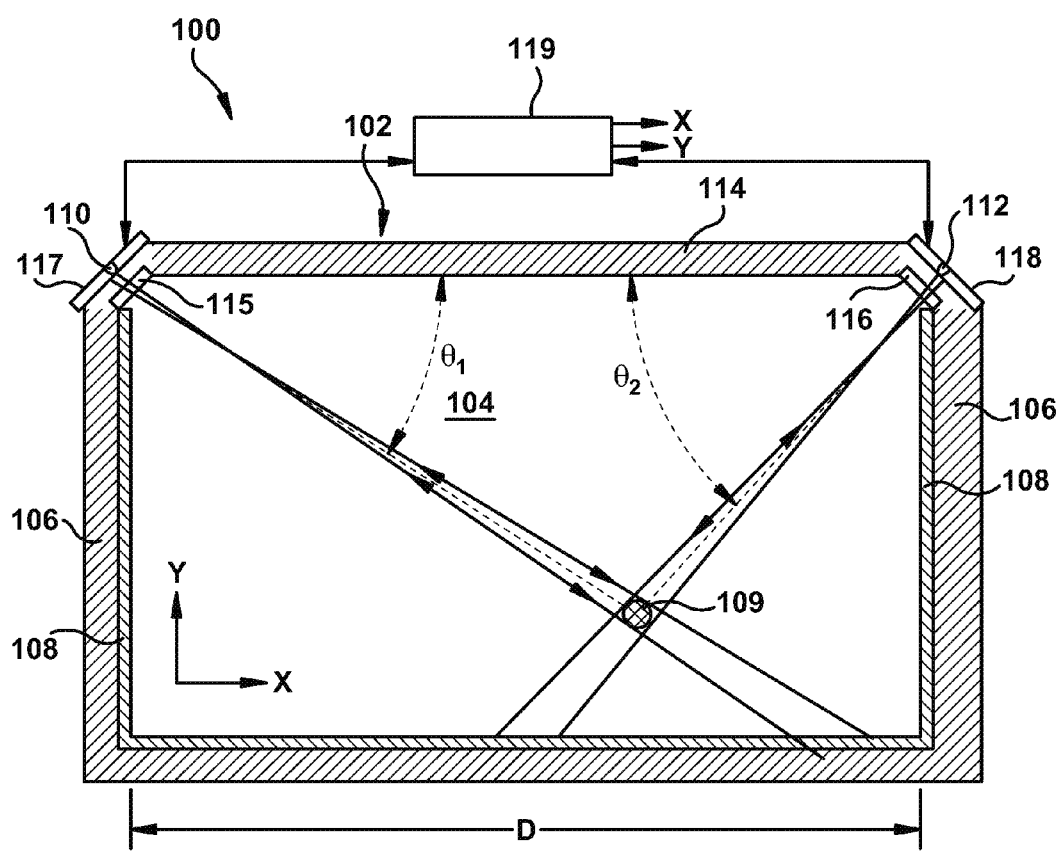
FIG. 1 is a schematic view of a touch screen system in accordance with aspects of the present invention.

In the detailed description that follows, corresponding components have been given the same reference numerals regardless of whether they are shown in different embodiments of the present invention. To illustrate the present invention in a clear and concise manner, the drawings may not necessarily be to scale and certain features may be shown in somewhat schematic form.

For purposes of this application, certain terms are used in a particular sense as defined herein and other terms in accordance with industry accepted practice, such as current ASTM definitions, for example.

The term "cube corner elements" (also "cube corner prisms" or "cube corners" or "cube corner retroreflective elements") as used herein includes those elements consisting of three mutually intersecting faces, the dihedral angles of which are generally on the order of 90 degrees, but not necessarily exactly 90 degrees.

The term "cube shape" as used herein means the two-dimensional geometric figure defined by the projection of the cube perimeter in the direction of the principal refracted ray. For example, a triangular cube has a cube shape that is a triangle.

The term "retroreflective substrate" as used herein means a thickness of a material having an array of either male or female cube corner elements formed on a second surface thereof. The first surface can be flat, or can be somewhat uneven in a pattern generally corresponding to the array of cube corner elements on the back surface. For male cube corner elements, the expression "substrate thickness" means the thickness of material on which the cube corner elements rest. For female cube corner elements, the expression "retroreflective substrate thickness" means the total thickness of material into which the female cube corner elements form cavities.

The term "cube axis" as used herein means a central axis that is the tri-sector of the internal space defined by the three intersection faces of a cube corner element. The term "canted cube corner" as used herein means a cube corner having its axis not normal to the sheeting surface. Cant is measured as the angle between the cube axis and the sheeting surface normal. It is noted that when there is cant, a plan view normal to the sheeting surface shows the face angles at the apex not all 120 degrees.

The term "face-more-parallel cant" (or "canted in a direction face-more-parallel or "canted in a face-more-parallel direction") and "edge-more parallel cant" as used herein refer to the positioning of the cube relative to the principal refracted ray. When the angles between the cube faces and the principal refracted ray are not all equal to 35.26°, the cube is "face-more-parallel" or "edge-more-parallel" depending upon whether the face angle with respect to the principal refracted ray that is most different from 35.26° is respectively greater or less than 35.26°. In the case of sheeting or other retroreflectors for which the principal refracted ray is nominally perpendicular to the front surface of the retroreflector, then for face-more-parallel cubes the selected cube face will also be more parallel to the reflector front surface than will any face of an uncanted cube.

An exemplary position detection system 100 in accordance with aspects of the present invention is illustrated in FIG. 1. FIG. 1 illustrates a plan view of a display 102 (e.g., a computer display, a touch screen display, etc.) having a screen area or viewing field 104 surrounded by a raised frame or border 106. While shown in the context of a computer display, the position detection system 100 may be used in any type of optical position detection system. The inner surface of the border 106, which is generally substantially perpendicular to the viewing field 104 of the display screen 102 is provided with a prismatic film (also referred to herein as retroreflective film 108). The prismatic film 108, which is discussed in detail below, provides a retroreflective surface around at least a portion of the viewing field 104 (also referred to herein as a detection field). That is, the prismatic film 108 provides a surface that reflects radiation from an originating radiation source back toward the originating source. The composition of the prismatic film 108 may be applied directly to the frame 106 through use of an adhesive or other attachment means, or it may be manufactured first in the form of an adhesive tape, which is subsequently applied to the inner surface of the border 106. It may be desirable to align the prismatic film in such a manner that a plane of maximum entrance angularity associated with the prismatic film is substantially parallel to the viewing field, the detection field and/or the display to optimize possible detection of an object in the area of interest.

The position detection system 100 shown in FIG. 1 further includes two sources of radiation 110, 112. The sources of radiation 110, 112 are preferably point sources (or substantially point sources). The first source 110 may be disposed at one corner of the viewing field 104 and the second source 112 may be disposed at another corner of the viewing field 104. In a preferred embodiment, the first source of radiation 110 and second source of radiation 112 have a common side 114. As shown in FIG. 1, side 114 may not be provided with the prismatic film 108, which is provided on the other three sides of the display 102. One of ordinary skill in the art will readily appreciate that the precise location of the radiation sources may vary depending a variety of design considerations, including environment, application, etc. Likewise, one of ordinary skill in the art will appreciate that the entire perimeter of the viewing field may be surrounded by prismatic film 108.

The sources of radiation 110, 112 together illuminate the entire viewing field 104 with radiation, which extends in a direction parallel to the plane of the viewing field 104. The sources of radiation may provide any desirable spectrum of electromagnetic radiation. That is, the sources of radiation may be selected to operate in any desired frequency range or at any desired wavelength. For example, the sources may be a source of infrared radiation, radio frequency radiation, visible light radiation, light emitting diode (LED), laser, etc. In a preferred embodiment, the sources 110, 112 are infrared light emitting diodes.

The prismatic film 108 provided around the perimeter of the viewing field reflects the infrared radiation back toward the respective originating sources as is indicated by the arrows within the viewing field. Thus, for example, a ray of infrared radiation originating from the point source 110 extends outward to the side of the display screen and returns to the point source 110, as shown in FIG. 1. As discussed in more detail below, electromagnetic radiation is reflected backward toward its source by the prismatic film 108.

As discussed more fully below, the prismatic film 108 comprises a retroreflective film having multiple layers, wherein one of the layers includes a plurality of triangular cube corner retroreflective elements that reflect the incoming radiation. One or more of the other layers that comprise the prismatic film 108 function to allow most of the infrared radiation through (e.g., a double-pass transmission of about 74% to about 100%) and substantially block visible light, which gives the film an appearance of darkness. These aspects of the invention will be further discussed below.

In operation, the exemplary position detecting system 100 operates to detect the existence and location of an object 109 within the borders of the frame 106. Assuming that the radiation originates from sources 110, 112 (e.g., infrared LED's) located at separate corners that have a common side, the radiation traverses outward and is reflected back into a corresponding lens 115, 116 situated over the point sources of radiation 110, 112, respectively. The lenses 115, 116 serve as optical apertures to image electromagnetic radiation transmitted by the point sources and received by cameras 117, 118, respectively. The lenses may be positioned at any desired distance away from the source. Preferably the distance is less than 10 mm. More preferably, the distance is 1.0 mm to 1.5 mm.

Cameras 117, 118 may be line scan cameras and/or area scan cameras. Cameras 117, 118 generally include an image capturing device in the form of a charge coupled device (CCD) sensor that is formed by an array of photosensitive elements (e.g., pixels). A line scan camera generally acquires an image on a single line of pixels. An area scan camera, like a conventional camera, includes a CCD sensor (usually rectangular in form) of pixels that generates two dimensional frames corresponding to length and width of the acquired image.

In operation, reflected radiation passes through corresponding lenses (e.g., lens 115 or lens 116, depending on the location of the radiation source) and forms an image of an object detected by CCD sensor. A quantity of light is converted to a video pulse signal and is then output. The CCD sensor converts the detected radiation on a photo diode array to an electrical signal and outputs the measured amount. One single scanning line of a line scan camera may generally be considered as a one-dimensional mapping of the brightness related to every single point of an observed line. A linear scanning generates a line, showing on the Y axis the brightness of each point given in grey levels (e.g., from 0 to 255 levels for an 8-bit CCD sensor or from 0 to 1023 for a 10-bit CCD sensor). The outputs from the cameras 117, 118 can be processed by a control unit 119 (as shown in FIG. 1) that produces output signals indicative of the X and Y coordinate position of the object 109. One of ordinary skill in the art will readily appreciate that a scan taken from an area camera will generate a two-dimensional mapping of the brightness related to every point of the observed area.

Figure 2:
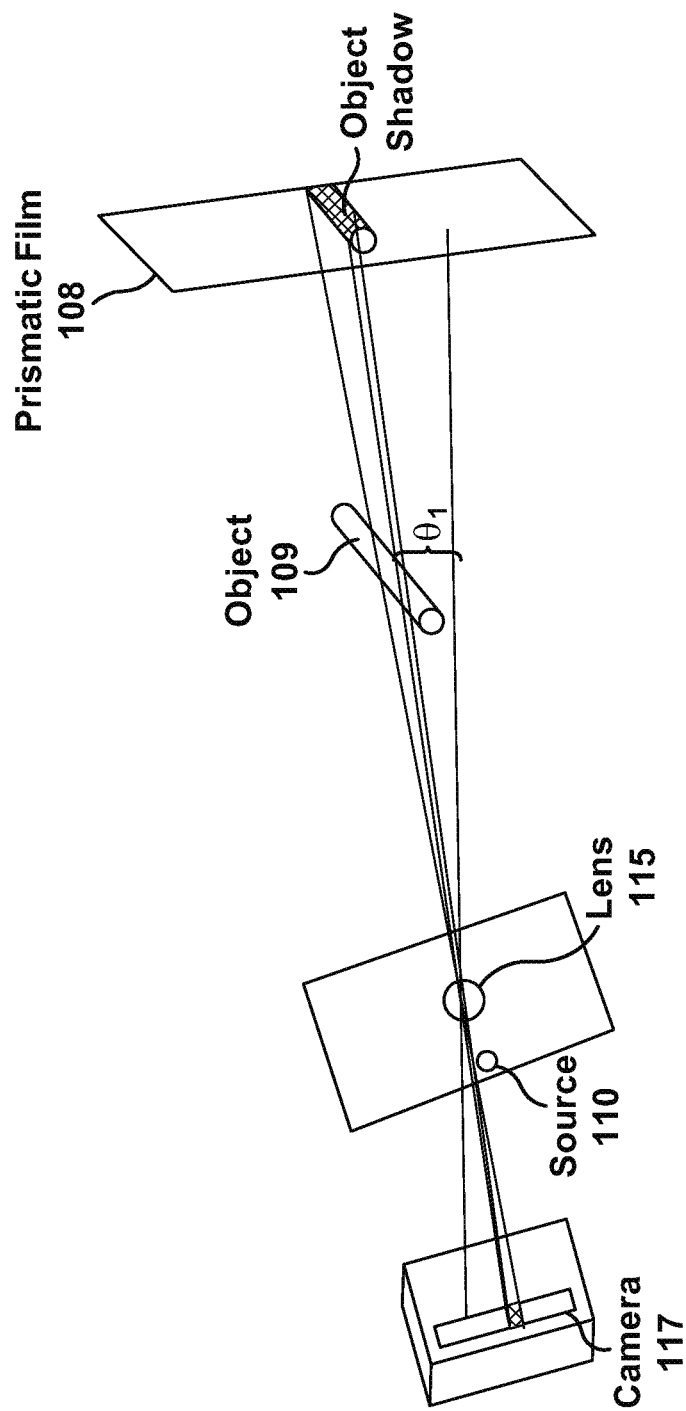
FIG. 2 is a cross-sectional of the touch screen system of FIG. 1 in accordance with the present invention.

The operation of the position detecting system 100 is best understood with reference to FIGS. 1 and 2. FIG. 2 is a cross-sectional illustration of relevant components of FIG. 1. As may be seen in FIGS. 1 and 2, infrared radiation emitted from radiation source 110 is emitted into the viewing field 104. The viewing field has a prismatic film 108 along two sides of the border 108, wherein the radiation source 117 is directed. Infrared radiation emitted from the radiation source 117 is reflected back to the line scan camera 117 by the prismatic film 108. The infrared radiation passes through the lens 115 to the line scan camera 117. The line scan camera generates a corresponding line image, having a digitized brightness value that depends on the resolution of line scan camera for the various points along the line of the scanner. For any position in the line image that does not receive radiation a logical value 0 is generated. For example, if an opaque object 109, such as a stylus or a human finger, enters the viewing field, a shadow is cast on the lens and the corresponding line scan camera, which results in very little or no charge being detected by the line scan camera for that particular pixel or area of pixels. In locations where radiation is detected, the radiation discharges a corresponding CCD sensor associated with the line scan camera, which generates a substantially higher signal value depending on the resolution of the line scan camera. If a combination of two radiation sources and line scan cameras are provided as are illustrated in FIG. 1, then the X and Y position of the object 109 may be determined by "triangulation". In this case, two angles $\theta_1$ and $\theta_2$ are measured and the X and Y coordinates are calculated from the values of these two angles plus the distance "D" between the two points of measurement, as shown in FIG. 1.

Figure 3:
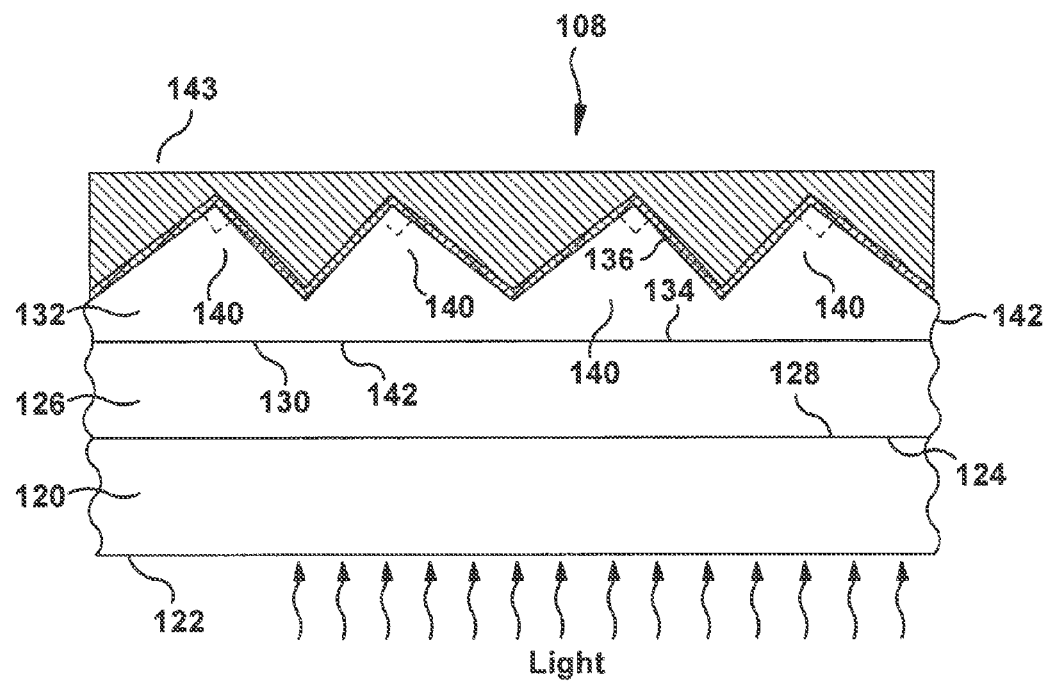
FIGS. 3 and 4 are cross-sectional views of prismatic film embodiments in accordance with the present invention.

The prismatic film (also referred to herein as the retroreflective film) 108 will now be discussed. Referring to FIG. 3, an exemplary prismatic film 108 in accordance with aspects of the present invention is illustrated in cross-sectional view. The prismatic film 108 includes a first substrate 120 having a first surface 122 and a second surface 124. The first surface 122 (also referred to as the front surface) of the prismatic film 108 is generally flat (and typically smooth). The second surface 124 is also generally flat and is secured to a second substrate 126.

The second substrate 126 has a first surface 128 and a second surface 130. As shown in FIG. 3, the first surface 128 of the second substrate 126 is generally flat (and typically smooth) and generally confronts the second surface 124 of the first substrate 120. The second surface 130 of the second substrate 126 is also generally flat and is secured to a retroreflective substrate 132.

The first and second substrates 120, 126 can be comprised of a material, such as a polymer that has a high modulus of elasticity. The polymer may be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, acrylic and polycarbonate polymers being preferred. Preferably, the first and second substrates are colored and/or have a dye distributed uniformly throughout the first and second substrates. In one embodiment, the first substrate 120 has a red dye distributed throughout and the second substrate 126 has a blue dye distributed throughout. In another embodiment, the first substrate 120 has blue dye distributed throughout and the second substrate 126 has a red dye distributed throughout. Both first and second substrates 120, 126 have dye distributed uniformly throughout. One of ordinary skill in the art will readily appreciate that aspects of the present invention include using any desirable color or combination of colors to obtain the desired functionality, aesthetic appearance, etc., discussed herein. For example, the substrates 120, 126 may have different colored dyes distributed throughout.

The substrates are preferably chosen to be highly transparent in infrared wavelengths and non-transparent in visible light wavelengths, which will provide a substantially black appearance. The bright background provided by the film is preferably made to be as bright and uniform, as reasonably possible, to allow detection of an object within the field of the prismatic film 108 (e.g., the detection field).

The retroreflective substrate 132 has a first surface 134 and a second surface 136. As shown in FIG. 3, first surface 134 is generally flat (and typically smooth) and generally confronts the second surface 130 of the second substrate 126. The second surface 136 includes or otherwise defines a plurality of cube corner retroreflective elements 140 and may be confronted with an adhesive 143 for use in an application. The retroreflective substrate 132, including the cube corner elements 140 formed therein, can be comprised of a transparent plastic material, such as a polymer that has a high modulus of elasticity. The polymer may be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitriles, hard epoxy acrylates, acrylics and the like, with acrylic and polycarbonate polymers being preferred.

Figure 4:
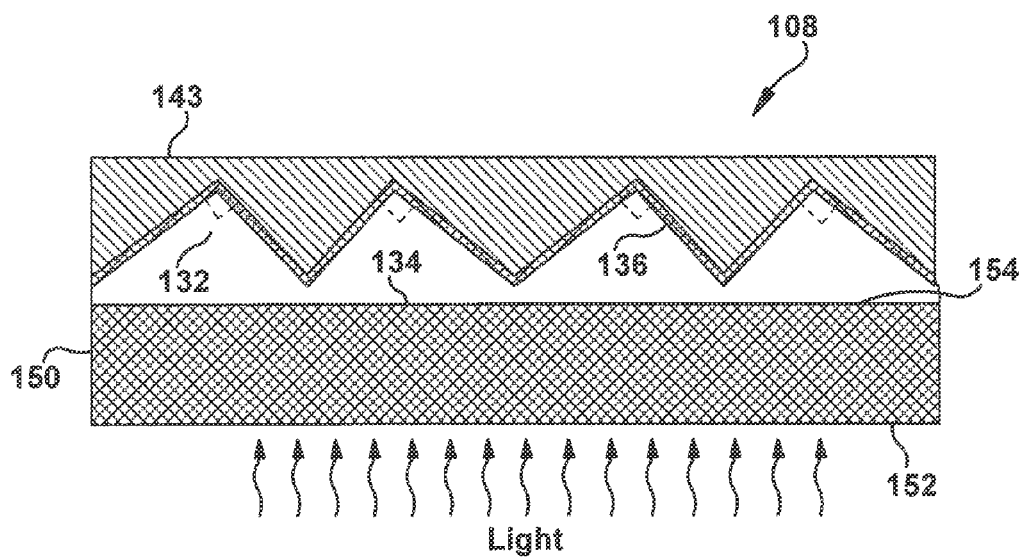

In another embodiment illustrated in FIG. 4, the first and second substrates 120, 126 may be replaced by a single substrate 150. The substrate 150 has a single dye layer film to absorb the visible light with a front surface 152 and an opposing back surface 154. The back surface 154 confronts the retroreflective substrate 132, as discussed above with respect to the second substrate. The front surface 152 is generally smooth. In one embodiment, the substrate 150 is colored black. Benefits associated with a single dye layer are to make the overall film structure thinner and increase uniformity of transmission through the single dye layer 150.

In one preferred embodiment, the retroreflective substrate 132, including the cube corner elements formed therein, is made of acrylic, e.g., an acrylic material having an index of refraction of about 1.49. Of course, other suitable materials having a higher or lower index of refraction can be employed without departing from the scope of the present invention. The cube corner elements can be formed within or as an integral part of the substrate using, for example, any of the methods described in co-owned U.S. Pat. Nos. 6,015,214 and 6,767,102 the disclosures of which are incorporated by reference in their entireties.

As is described more fully below, the refractive index of the substrate, the size and canting of the cube corner elements may be selected to provide a desired retroreflectivity and uniformity. While the present invention is being described with respect to cube corner elements that are formed integrally as part of the substrate, it is to be appreciated that the present invention is applicable to cube corner elements that are formed separately (e.g., by casting or molding) from the substrate and bonded to the substrate.

The plurality of cube corner elements 140 are metallized 142 with a suitable metal, such as aluminum, silver, nickel, gold or the like. Such metallization can be provided by depositing (e.g., sputtering or vacuum depositing) a metal film over the surfaces of the cube corner elements. The metallized cube corner side of the substrate can be coated with or otherwise embedded in an adhesive 143 (forming, for example a product similar to conspicuity tape). The metallization of the cube corner elements allows the display to be cleaned and otherwise not susceptible to contaminants and/or moisture that may have deleterious effects on the retroreflectivity of the retroreflective film 108.

Figure 5:
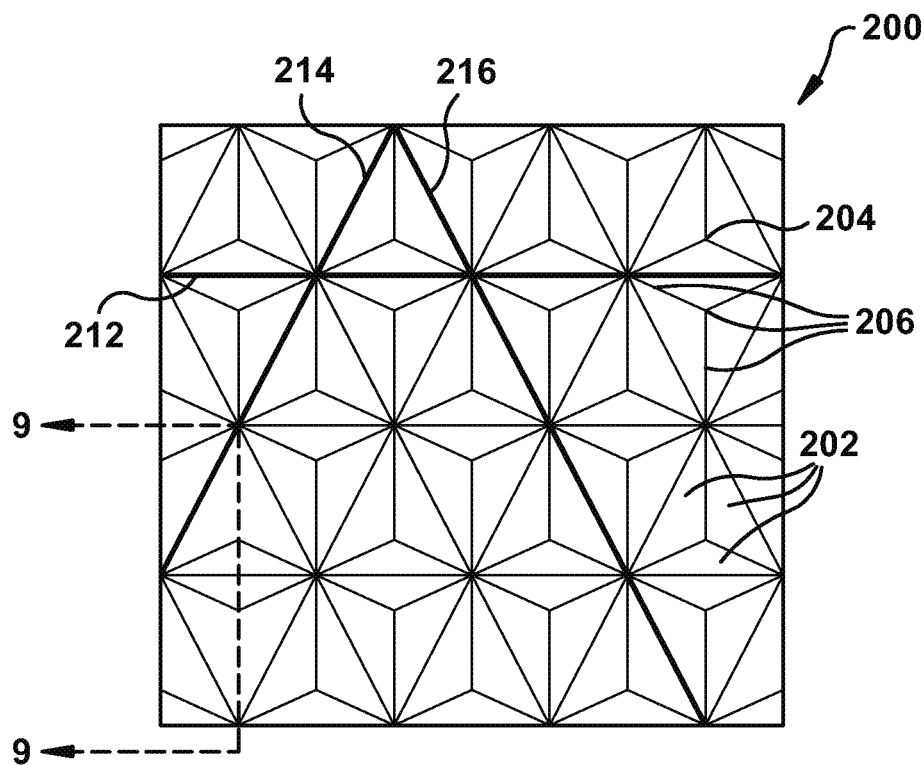
FIG. 5 is a plan view of prismatic film with an array of canted cube corner retroreflective elements as shown in FIGS. 3 and 4.

With reference now to FIGS. 5-9 and continued reference to FIG. 3, the retroreflective film 108 includes a plurality of individual cube corner elements 140 (FIG. 3) that are arranged in or otherwise formed as an array 200 (FIG. 5). Each cube corner element 140 is formed by three mutually perpendicular (or substantially perpendicular) faces 202 that meet at an apex 204. The mutually perpendicular faces intersect one another at dihedral edges 206. The angles at the dihedral edges 206, between the mutually intersecting faces 202 are commonly referred to as dihedral angles. In a geometrically perfect cube corner element, each of the three dihedral angles is exactly 90 degrees. However, it is to be appreciated that one or more of the dihedral angles may vary slightly from 90 degrees depending upon manufacturing irregularities or design choices.

Figure 6:
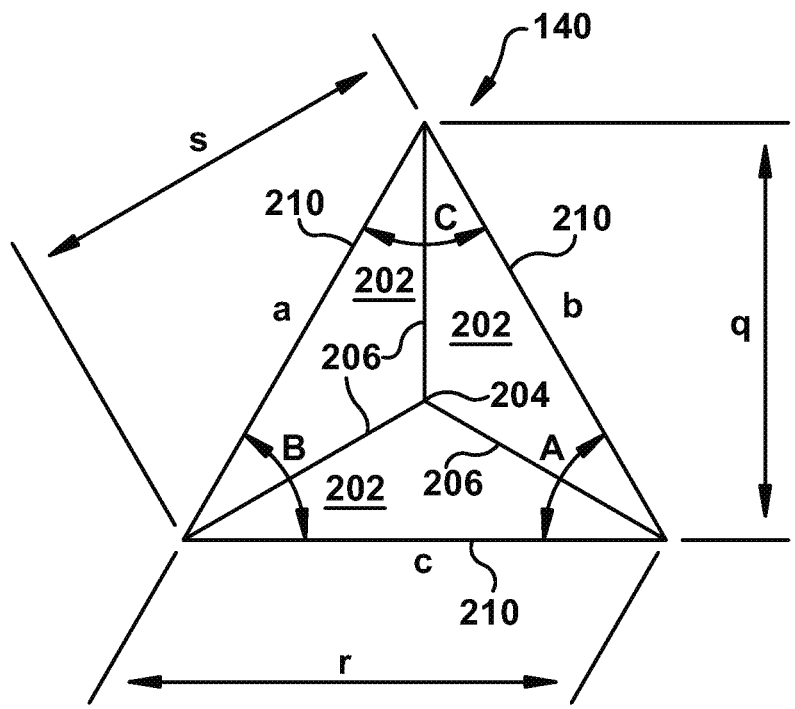
FIG. 6 is a plan view of an exemplary canted cube corner retroreflective structure in accordance with aspects of the present invention.

As depicted in FIG. 6, each cube corner element 140 has a triangular cube shape with three base edges 210. In one embodiment, each cube corner element 140 has an isosceles triangle cube shape, where two of the base edges (e.g., base edges having lengths a and b) are approximately the same length. Alternatively, one or more of the cube corner elements 140 can have a non-isosceles triangle cube shape.

Because base edges 210 of cube corner element 140 are linear and in a common plane, an array of such is defined by intersecting sets of grooves. As shown in FIG. 5, each cube corner element 140 is defined by three V-shaped grooves 212, 214, 216, which are each one member of three sets of grooves that cross the array 200 in an intersecting pattern to form matched pairs of cube corner elements. Normally all three sets of grooves are cut to the same depth, but one or more sets of grooves may be offset vertically (i.e., cut shallow or deep with respect to the others). Also, one of the groove sets can be offset horizontally, causing the cube shape to differ from a triangle. Such cubes are still considered triangular cube corners and are within the scope of this invention. In the embodiment illustrated in FIG. 6, faces adjacent sides a and b have a half groove angle of about 38.5 degrees (e.g., 38.5211 degrees), while the face adjacent side c has a half groove angle of about 28.3 degrees (e.g., 28.2639 degrees).

Figure 7:
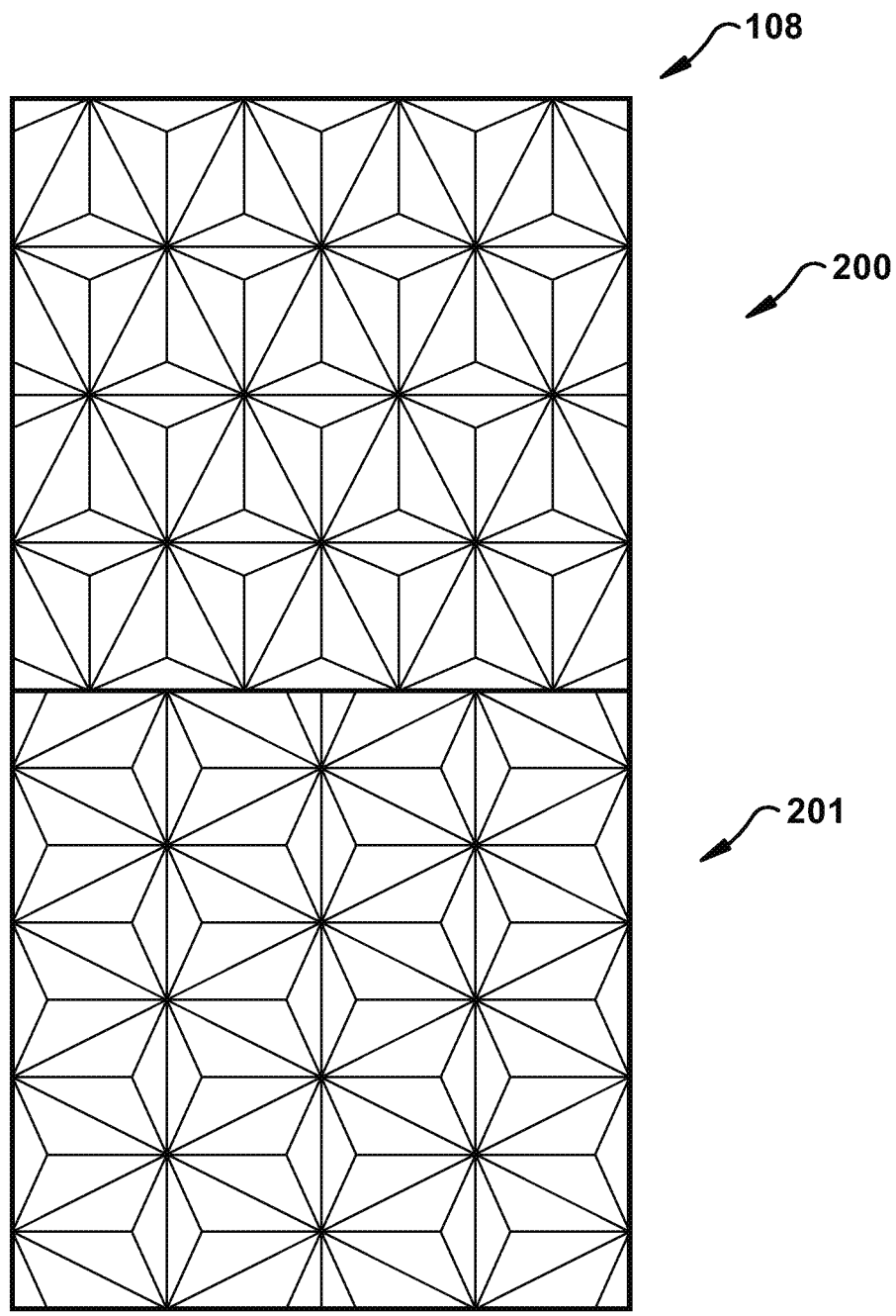
FIG. 7 is a plan view of prismatic film with two arrays of canted cube corner retroreflective elements as shown in FIG. 6, where the cube corner retroreflective elements in the arrays are rotated by 90 degrees relative to one another.
Figure 8:
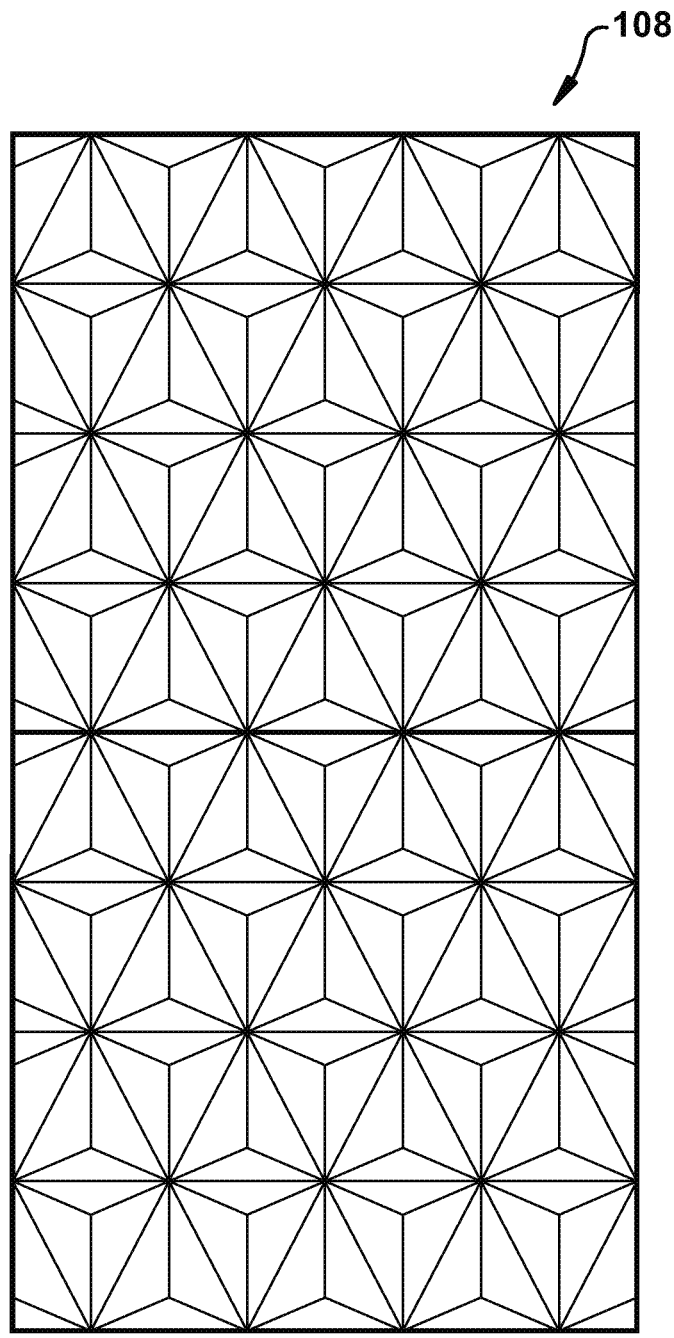
FIG. 8 is a plan view of unpinned prismatic film of canted cube corner retroreflective elements as shown in FIG. 6.
Figure 9:
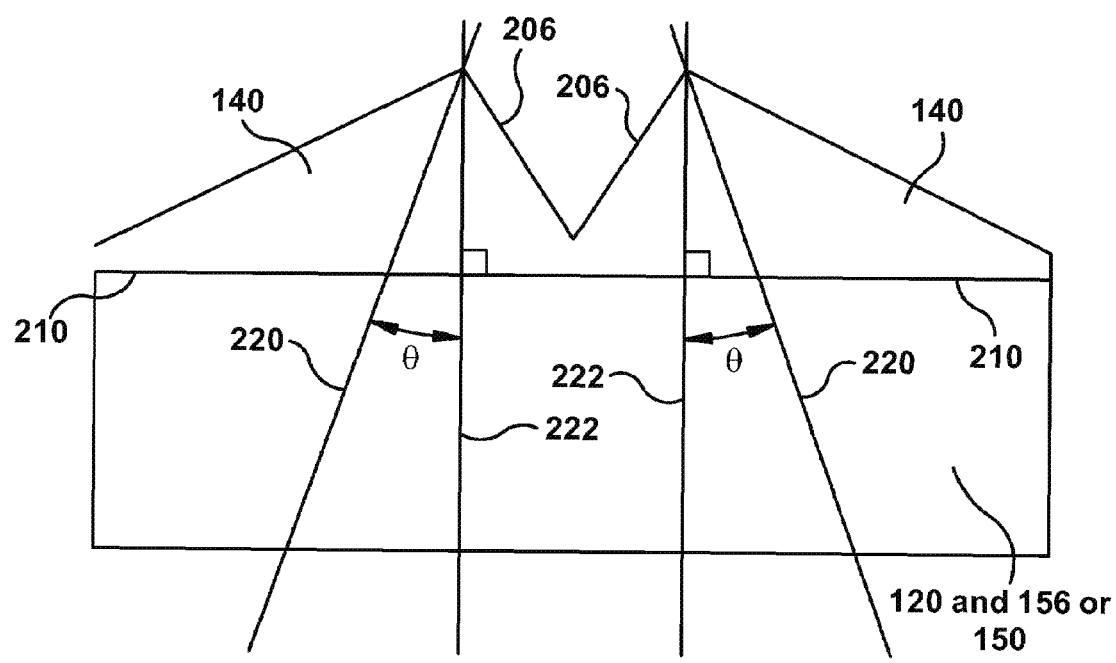
FIG. 9 is a cross-sectional view of FIG. 5 taken along line 9-9.

The array 200 (as shown in FIG. 7) may be replicated several times over (for example in approximately square tiles of a desired size) to form array tiles. FIG. 7 shows a plan view of prismatic film 108 in which multiple arrays of cube corner elements are rotated about the sheeting normal by 90 degrees. For example, the illustrated sheeting 108 includes a first array 200 and a second array 201 that are joined together to form a single retroreflective sheeting article. The second array 201 includes cube corner elements that are rotated by 90 degrees with respect to the cube corner elements in the first array 200. The prismatic film may also be provided in a linear arrangement, as illustrated in FIG. 8. It is to be appreciated that the retroreflective sheeting can include multiple arrays or tiles of cube corner elements joined together, where each array or tile is rotated by some angle relative to other arrays (e.g., one array with a relative cube corner orientation of 0 degrees, another array with a relative cube corner orientation of 90 degrees, another array with a relative cube corner orientation of 180 degrees, and another array with a relative cube corner orientation of about 270 degrees). Sheeting with multiple tiles having differing cube corner orientations is referred to as pinned sheeting. Sheeting with one tile or multiple tiles all having the same cube corner orientation is referred to as unpinned sheeting.

In prismatic films, a cube corner element is generally used with at least one other cube corner element as part of a matched pair and commonly is used with an array of such elements. Such an array is shown in FIGS. 5-8, and such a matched pair is shown in cross-section in FIG. 9.

The cube corner elements illustrated in FIGS. 6 and 8 and repeated in the arrays of FIGS. 5, 6 and 7) are canted in the edge-more-parallel direction by about 7 degrees. In this exemplary embodiment, each cube corner element has a height of about 101 microns (about 0.004 inches or about 4 mil).

As discussed above, one aspect of the present invention is directed to providing a retroreflective film that has a high brightness value. Accordingly, highly reflective prismatic sheeting is utilized to achieve this goal. However, the choice of prismatic sheeting potentially compromises the desire for uniformity. The geometry of a typical touch screen display is such that entrance angles range from 0 to 60 degrees. One of ordinary skill in the art will readily appreciate that this is a very large range over which to maintain uniform brightness with prismatic sheeting. Because observation angles also vary, particular care should be made in the selection of the cube geometry and size to achieve a combination of high brightness and good uniformity.

For prismatic sheeting applications, triangular cube corner prisms are most commonly used, because they can be directly machined into a substrate using conventional ruling or diamond turning techniques. An algorithm has been developed to simulate the signal brightness and uniformity as a function of geometry and size for isosceles triangular cube corners cut with equal groove depths. For these cube corners, the geometry and size are fully determined by two parameters: cube cant, and cube depth. One of ordinary skill in the art will readily appreciate that other types of triangular cube corners are possible, including for example, scalene triangles and bi-level or tri-level cutting of the groove sets. In these cases, it is not the cube cant/cube depth combination per se that determines signal brightness and uniformity, but rather the active aperture size for each direction of incident light.

Figure 10:
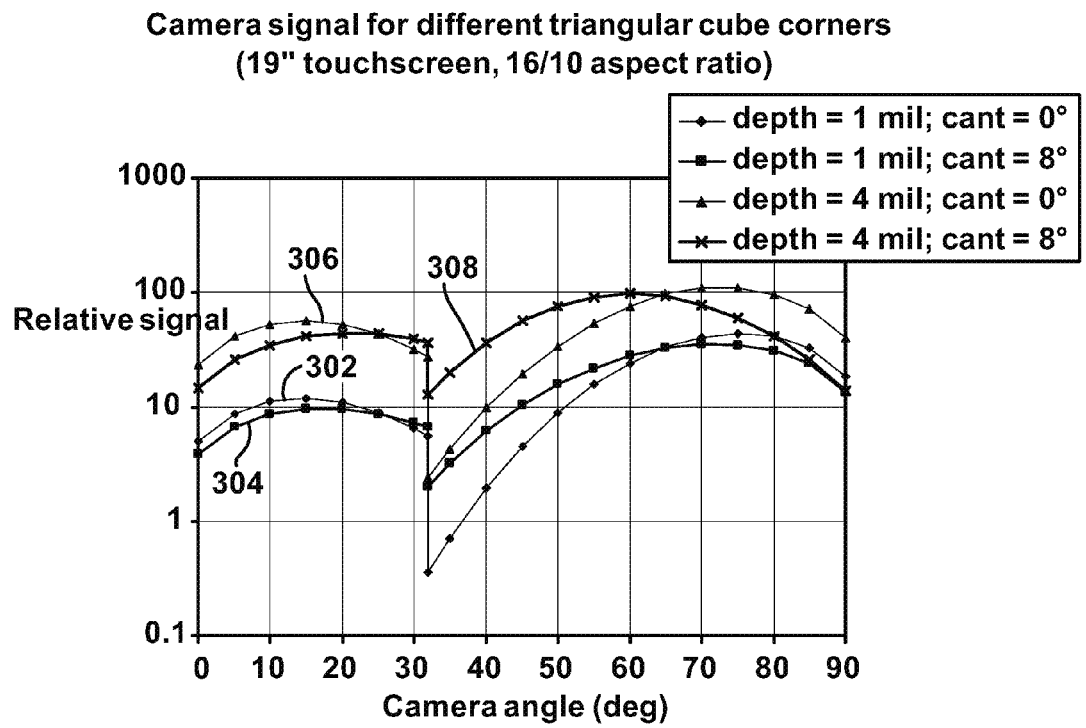
FIG. 10 is an exemplary plot of camera signal for different triangular cube corners in accordance with aspects of the present invention.

Referring to FIG. 10 exemplary graphs are provided that illustrate four different simulated camera signals for different triangular cube designs. The main parameters of interest in each signal are: 1) the minimum signal value for all camera angles, which is a measure of brightness; and 2) the maximum signal value divided by the minimum signal value (e.g., signal range), which is a measure of uniformity. As shown in FIG. 10, four signals are plotted by measuring the relative signal versus camera angle. Signal 302 illustrates a representative signal when the cube depth is 1 mil (0.001") and cube cant is 0 degrees. Signal 304 illustrates a representative signal when the cube depth is 1 mil (0.001") and cube cant is 8 degrees. Signal 306 illustrates a representative signal when the cube depth is 4 mil (0.004") and cube cant is 0 degrees. Signal 308 illustrates a representative signal when the cube depth is 4 mil (0.004") and cube cant is 8 degrees. As shown in FIG. 10, steep drop-off in relative signal strength occurs for each of the signals at approximately 32 degrees, which is due to a transition of the angle of view from one side of the touch screen to the bottom edge of the touch screen as the view shifts from a medium entrance angle to a large entrance angle.

In order to understand the impact of cube corner design on these parameters of interest (e.g., uniformity and brightness), a plot of the signal minimum/range is plotted as a function of cube cant and cube depth, as shown in FIGS. 11-14 and 15-18. FIGS. 11-14 plot the signal minimum/range as a function of cube cant and cube depth. In these plots, face more parallel cant is distinguished from edge more parallel cant using a sign convention. Face more parallel cant is represented as negative. Edge more parallel cant is represented as positive. The plots are for displays having sizes of 17 inch (FIG. 11), 19 inch (FIG. 12), 22 inch (FIG. 13) and 30 inch (FIG. 14) when the distance between the source and the camera is 1.0 mm. When this is done, there are three regions of improved performance.

Figure 11:
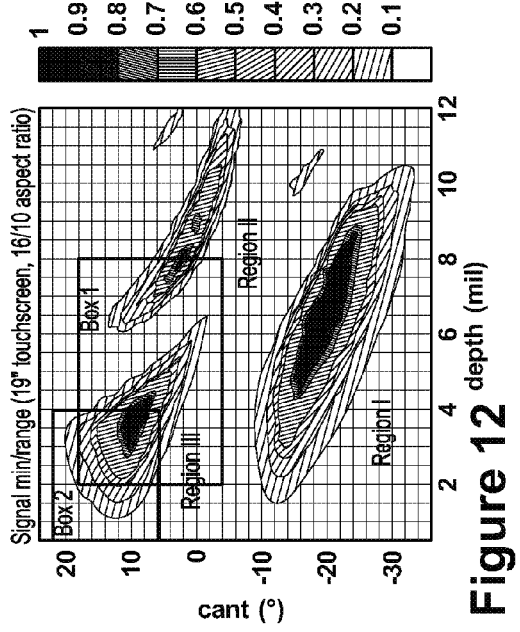
FIGS. 11-18 are exemplary plots of minimum signal/range plotted as a function of Cant (Degrees) and Cube Depth (mil) in accordance with aspects of the present invention.
Figure 12:
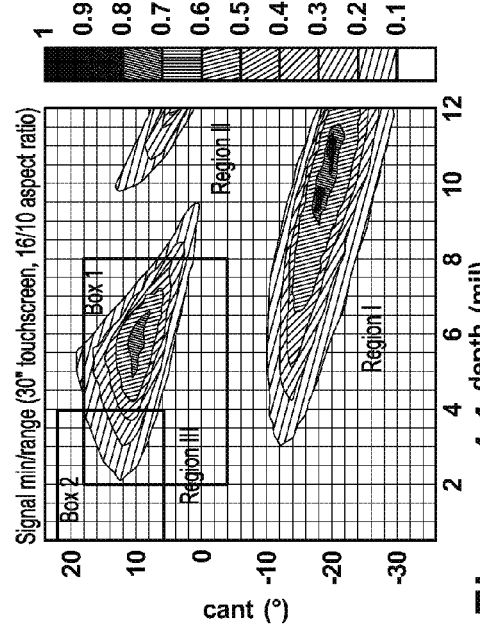
Figure 13:
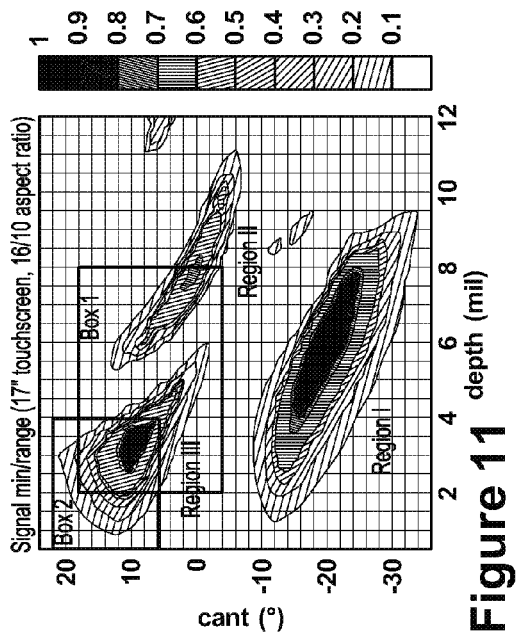
Figure 14:
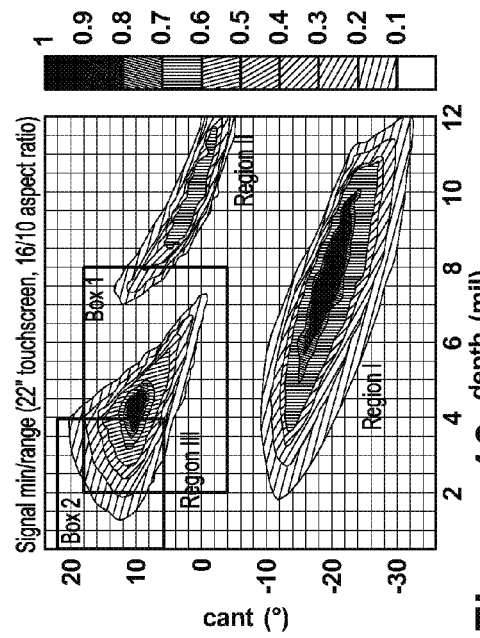

One region, identified as Region I, has large negative cants (as shown in the lower regions of FIGS. 11-14) This region shows optimized performance in a range from about −8.0 to −34° cant, and from about 1.0 to over 12.0 mil (0.001" to 0.012") depending on the screen size. For example, FIG. 11 illustrates optimized performance in a range from about −8.0 to −34 degrees cant and a cube depth of about 1 to 9.5 mil (0.001" to 0.0095"). FIG. 12 illustrates optimized performance in a range from about −9.0 to −34 degrees cant and a cube depth of about 1.5 to 10.5 mil (0.0015" to 0.0105"). FIG. 13 illustrates optimized performance in a range from about −9.5 to −33 degrees cant and a cube depth of about 1.5 to 12 mil (0.0015" to 0.012"). FIG. 14 illustrates optimized performance in a range from about −10 to about −30 degrees cant and a cube depth of about 3 to over 12.0 mil (0.003" to 0.012+"). Thus, a relationship between cube depth and display size was discovered for this region.

Another region (Region II) contains mostly positive cant, but large cube depths (as shown in the upper right regions of FIGS. 11-14), which are generally difficult to manufacture due to complications associated with replication and flexibility.

A third region (Region III appearing generally in the upper left regions of FIGS. 11-14) shows optimized performance in a range from about −2 to +22 degrees in cant, and from about 0.5 to 9.5 mils (0.0005" to 0.0095") in depth. For example, FIG. 11 illustrates optimized performance in a range from about −2 to +22 degrees cant and a cube depth of about 0.5 to 6.5 mil (0.0005" to 0.0065"). FIG. 12 illustrates optimized performance in a range from about −2 to +20 degrees cant and a cube depth of about 1.0 to 6.5 mil (0.001" to 0.0065"). FIG. 13 illustrates optimized performance in a range from about −2 to +20 degrees cant and a cube depth of about 1.0 to 7.5 mil (0.001" to 0.0075"). FIG. 14 illustrates optimized performance in a range from about −0 to about +20 degrees cant and a cube depth of about 2 to 9.5 mil (0.002" to 0.0095"). Thus, a relationship between cube depth and display size was also discovered for this region. For example, the cube depth for improved performance increases as the size of the display increases. Thus, optimal cube depth may be determined by a constant (K) multiplied by the screen size. The constant K will may need to take into account the aspect ratio of the display. As shown in FIGS. 11-14, the aspect ratio for each of the displays is 16/10.

Figure 15:
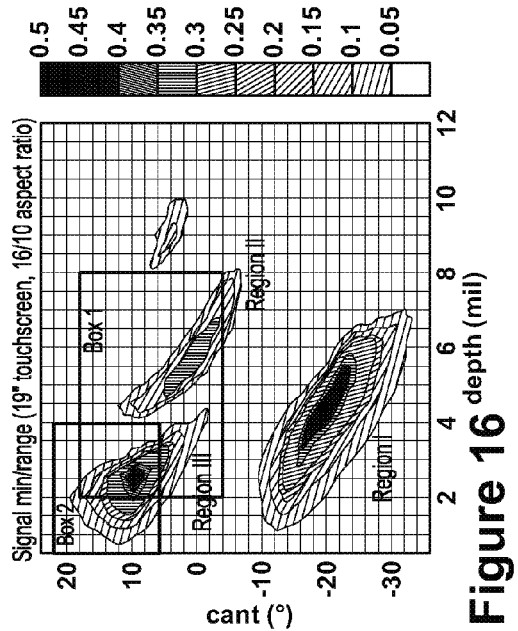
Figure 16:
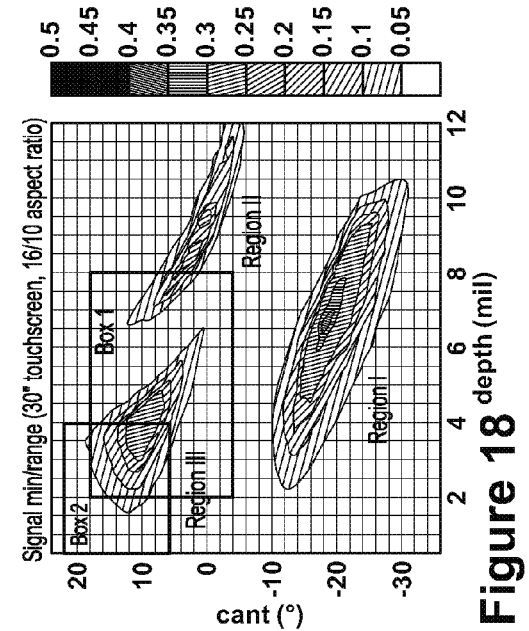
Figure 17:
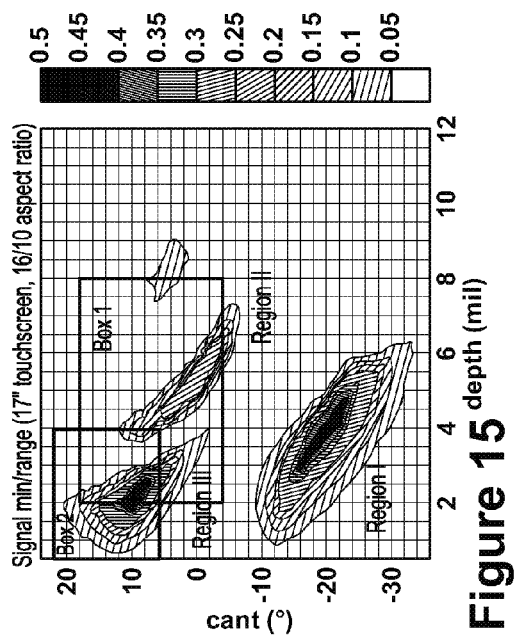
Figure 18:
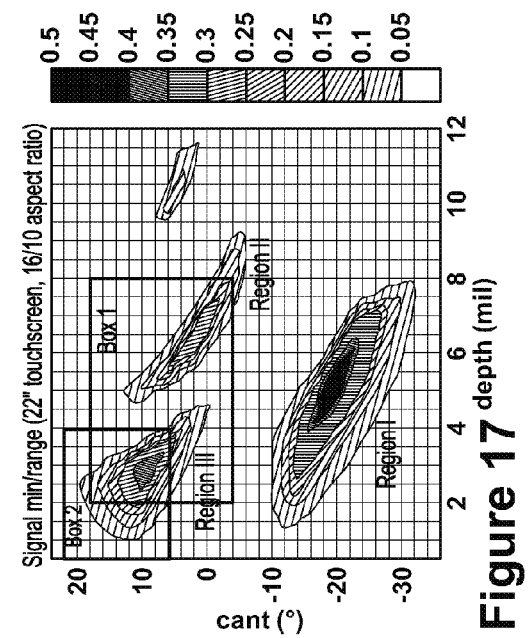

Likewise, FIGS. 15-18 plot the signal minimum/range as a function of cube cant and cube depth for displays having sizes of 17 inch (FIG. 15), 19 inch (FIG. 16), 22 inch (FIG. 17) and 30 inch (FIG. 18). The distance between the source and the camera is 1.5 mm, as opposed to 1.0 mm in FIGS. 11-14. The FIGS. 15-18 generally have the same regions (Regions I, II, III) as discussed above with respect to FIGS. 11-14. The optimal cube depth appears to be shifted to the left (e.g., a smaller cube depth) and the range appears to be narrower for both regions of interest. For example, in the negative cant region (Region I) optimized performance in a range from about −9 to −34 degrees in cant, and from about 0.5 to 11.0 mils (0.0005" to 0.011") in depth. FIG. 15 illustrates optimized performance in a range from about −9 to −34 degrees cant and a cube depth of about 0.5 to 6.5 mil (0.0005" to 0.0065"). FIG. 16 illustrates optimized performance in a range from about −9.5 to −34 degrees cant and a cube depth from about 1.0 to 7.0 mil (0.001" to 0.007"). FIG. 17 illustrates optimized performance in a range from about −10 to −32 degrees cant and a cube depth of about 1.0 to 8.0 mil (0.001" to 0.008"). Referring to FIG. 18, optimized performance is illustrated in a range from about −10 to −32 degrees cant and a cube depth of about 2.0 to 11.0 mil (0.002" to 0.011").

In the positive cant region (Region III) optimized performance is found in a range from about −2 to 22 degrees in cant, and from about 0.5 to 6.5 mils (0.0005" to 0.0065") in depth. For example, referring to FIG. 15, optimized performance for the 17 inch display is shown in range from about −2 to +22 degrees cant and a cube depth of about 0.5 to 4.0 mil (0.0005" to 0.004"). Referring to FIG. 16, optimized performance is shown in a range from about −2 to +20 degrees cant and a cube depth of about 0.5 to 4.5 mil (0.0005" to 0.0045"). Referring to FIG. 17, optimized performance is shown in a range from about −2 to +20 degrees cant and a cube depth of about 0.5 to 5.0 mil (0.0005" to 0.005"). Referring to FIG. 18, optimized performance is shown in a range from about 0 to +20 degrees cant and a cube depth of about 1.5 to 6.5 mil (0.0015" to 0.0065").

As can be seen by a comparison of FIGS. 11-14 and corresponding FIGS. 15-18, the optimal cube depth and cant may also be influenced by the spacing (or distance) between the radiation source and the camera. For example, the larger the spacing between the radiation source and the camera, a smaller cube depth may be used for optimal performance.

FIGS. 11-18 further illustrate that the shallower cubes (smaller cube depths) tend to perform better at higher cants. This can be seen by considering Region III and how it varies with screen size and source/camera spacing. Accordingly, two regions associated with Region III have been identified to make use of this observation. These regions have been selected because they offer high performance for a variety of screen sizes and source/camera spacing. These regions are identified by rectangular boxes in FIGS. 11-18. For example, Box 1 is illustrated in a region having a cant of −4 to +18 degrees and a cube depth of 2.0 to 8.0 mil (0.002" to 0.008") and contains high performing depth/cant combinations for larger cube sizes. Box 2 is illustrated in a region having a cant of 5.5 to 22 degrees and a cube depth of 0.5 to 4.0 mil (0.0005" to 0.004") and contains high performing depth/cant combinations for smaller cube sizes. In Region I, high performance for a variety of screen sizes and source/camera spacings can be found in a region having cant in a range of between about 8 to 35 degrees and a cube depth between 0.001 and 0.012 inches.

Figure 19:
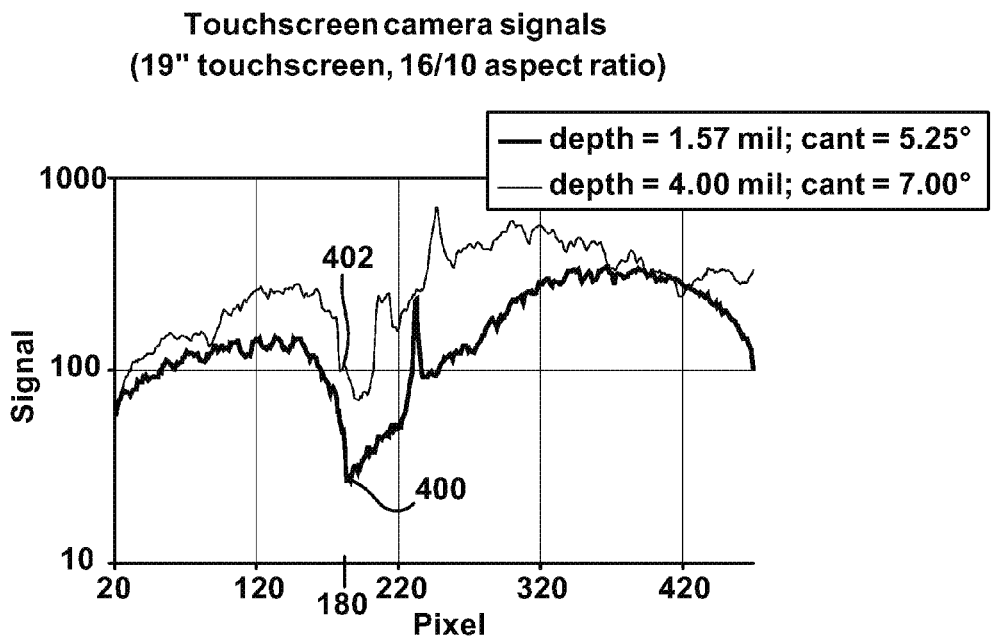
FIG. 19 is an exemplary comparison of the prismatic film of the present invention and a conventional film material.

FIG. 19 illustrates a comparison of two different types of prismatic films that were used in a display (e.g., a touch screen display). The first film had a cube depth outside of the preferred regions (e.g., the regions covered by Box 1 and Box 2). The second film had a cube depth within the preferred region (e.g., within Box 2). FIG. 15 illustrates an improvement both in minimum signal and in signal range. Signal 400 is plotted for the first film (having a cube depth outside of the preferred region). Signal 400 reaches its lowest point around 180 pixels. This is due to the two cameras 117, 118 of the system 100 (shown in FIG. 1) being only able to see two of the three surfaces of the screen (e.g., horizontally and vertically −90 degrees). The 180 pixel range is roughly the area of the corners of the screen. Signal 402 corresponds to the second film (having a cube depth within the preferred region) and shows a higher signal in the same area (about double the signal strength of signal 400 at 180 pixels).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A prismatic film positionable along a periphery of at least a portion of the viewing area of a display, comprising:
    an unpinned prismatic film having a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface, and a metallized layer disposed over at least a portion of the retroreflective substrate;
    wherein the retroreflective elements have a cant in a range of between about 4 degrees in a face more parallel direction to 18 degrees in an edge more parallel direction and a cube depth between about 0.002 and 0.008 inches,
    wherein base edges of the cube corner reflective elements are linear and in common plane,
    wherein each cube corner reflective elements forms an isosceles triangle cube shape with two of the base edges being approximately the same length, and
    wherein cube corner depth is determined by a constant (K) multiplied by a size of the viewing area of the display.

2. The prismatic film of claim 1, wherein the first substrate has a smooth outer surface.

3. The prismatic film of claim 2, wherein the first substrate has a black dye uniformly distributed throughout.

4. The prismatic film of claim 2, wherein the first substrate has a red dye or a blue dye uniformly distributed throughout.

5. The prismatic film of claim 1, wherein the first substrate has a red dye distributed throughout and the second substrate has a blue dye distributed throughout.

6. The prismatic film of claim 1, wherein the first substrate has a blue dye distributed throughout and the second substrate has a red dye distributed throughout.

7. The prismatic film of claim 1, wherein the first and second substrates are transparent in infrared wavelengths and non-transparent in visible light wavelengths, and the prismatic film is substantially black in appearance.

8. A prismatic film positionable along a periphery of at least a portion of the viewing area of a display comprising:
    an unpinned prismatic film having a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface, and a metallized layer disposed over at least a portion of the retroreflective substrate;
    wherein the retroreflective elements have a cant in a range of between about 5.5 degrees and 22 degrees in an edge more parallel direction and a cube depth between about 0.0005 and 0.004 inches,
    wherein base edges of the cube corner reflective elements are linear and in common plane,
    wherein each cube corner reflective elements forms an isosceles triangle cube shape with two of the base edges being approximately the same length, and
    wherein cube corner depth is determined by a constant (K) multiplied by a size of the viewing area of the display.

9. The prismatic reflective film of claim 8, wherein the first substrate has a smooth outer surface.

10. A prismatic film positionable along periphery of at least a portion of the viewing area of a display comprising:
an unpinned prismatic film having a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface, and a metallized layer disposed over at least a portion of the retroreflective substrate;
wherein the retroreflective elements have a cant in a range of between about 8 degrees and 35 degrees in a face more parallel direction and a cube depth between 0.001 and 0.012 inches,
wherein base edges of the cube corner reflective elements are linear and in common plane,
wherein each cube corner reflective elements forms an isosceles triangle cube shape with two of the base edges being approximately the same length, and
wherein cube corner depth is determined by a constant (K) multiplied by a size of the viewing area of the display.

11. A position detection system comprising:
at least one source of electromagnetic radiation for outputting a electromagnetic radiation over at least a portion of a detection area; and
a camera positioned to receive electromagnetic radiation reflected from a prismatic film positioned along a periphery of at least a portion of the detection area, wherein the prismatic film includes a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface and the retroreflective elements have a cant in a range of between about 4 degrees in a face more parallel direction to 18 degrees in an edge more parallel direction and a cube depth between about 0.002 and 0.008 inches;
wherein base edges of the cube corner reflective elements are linear and in common plane,
wherein each cube corner reflective elements forms an isosceles triangle cube shape with two of the base edges being approximately the same length, and
wherein cube corner depth is determined by a constant (K) multiplied by a size of the viewing area of the display.

12. The system of claim 11, further including a metallized layer disposed over the plurality of retroreflective elements for preventing contaminants and/or moisture from coming in contact with the retroreflective elements.

13. The system of claim 11, wherein the prismatic film has a double-pass transmission of more than 74% when the source is an infrared source and the prismatic film is substantially opaque when viewed in visible light.

14. The system of claim 11, wherein the position detection system includes a detection field which is a touch screen display.

15. The system of claim 14, wherein the prismatic film is aligned such that a plane of maximum entrance angularity associated with the prismatic film is substantially parallel to the touch screen.

16. The position detection system of claim 11, wherein the first substrate of the prismatic film has a red dye distributed throughout and the second substrate of the prismatic film has a blue dye distributed throughout.

17. The position detection system of claim 11, wherein the first substrate of the prismatic film has a blue dye distributed throughout and the second substrate of the prismatic film has a red dye distributed throughout.

18. A position detection system comprising:
at least one source of electromagnetic radiation for outputting a electromagnetic radiation over at least a portion of a detection area; and
a camera positioned to receive electromagnetic radiation reflected from a prismatic film positioned along a periphery of at least a portion of the detection area, wherein the prismatic film includes a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface and the retroreflective elements have a cant in a range of between about 8 degrees and 35 degrees in a face more parallel direction and a cube depth between 0.001 and 0.012 inches;
wherein base edges of the cube corner reflective elements are linear and in common plane,
wherein each cube corner reflective elements forms an isosceles triangle cube shape with two of the base edges being approximately the same length, and
wherein cube corner depth is determined by a constant (K multiplied by a size of the viewing area of the display.

19. The system of claim 18, further including a metallized layer disposed over the plurality of retroreflective elements for preventing contaminants and/or moisture from coming in contact with the retroreflective elements.

20. The system of claim 18, wherein the first substrate is positioned between the plurality of retroreflective elements and the source.

21. The system of claim 18, wherein the prismatic film has a double-pass transmission of more than 74% when the source is an infrared source and the prismatic film is substantially opaque when viewed in visible light.

22. A position detection system comprising:
at least one source of electromagnetic radiation for outputting a electromagnetic radiation over at least a portion of a detection area; and
a camera positioned to receive electromagnetic radiation reflected from a prismatic film positioned along a periphery of at least a portion of the detection area, wherein the prismatic film includes a retroreflective substrate, the retroreflective substrate having a plurality of triangular cube corner retroreflective elements formed in a first surface and a smooth second surface opposite the first surface, a first substrate disposed over at least a portion of the smooth second surface, a second substrate disposed between the first substrate and the smooth second surface and the retroreflective elements have a cant in a range between about 5.5 degrees and 22 degrees in an edge more parallel direction and a cube depth between about 0.0005 and 0.004 inches;
wherein base edges of the cube corner reflective elements are linear and in common plane,
wherein each cube corner reflective elements forms an isosceles triangle cube shape with two of the base edges being approximately the same length, and
wherein cube corner depth is determined by a constant (K) multiplied by a size of the viewing area of the display.

23. The system of claim 22, further including a metallized layer disposed over the plurality of retroreflective elements for preventing contaminants and/or moisture from coming in contact with the reflective elements.

24. The system of claim 22, wherein the prismatic film has a double-pass transmission of more than 74% when the source is an infrared source and the prismatic film is substantially opaque when viewed in visible light.

* * * * *